A. A. KELLOGG.
AUTOMOBILE JACK.
APPLICATION FILED NOV. 6, 1915.
1,178,855.
Patented Apr. 11, 1916.
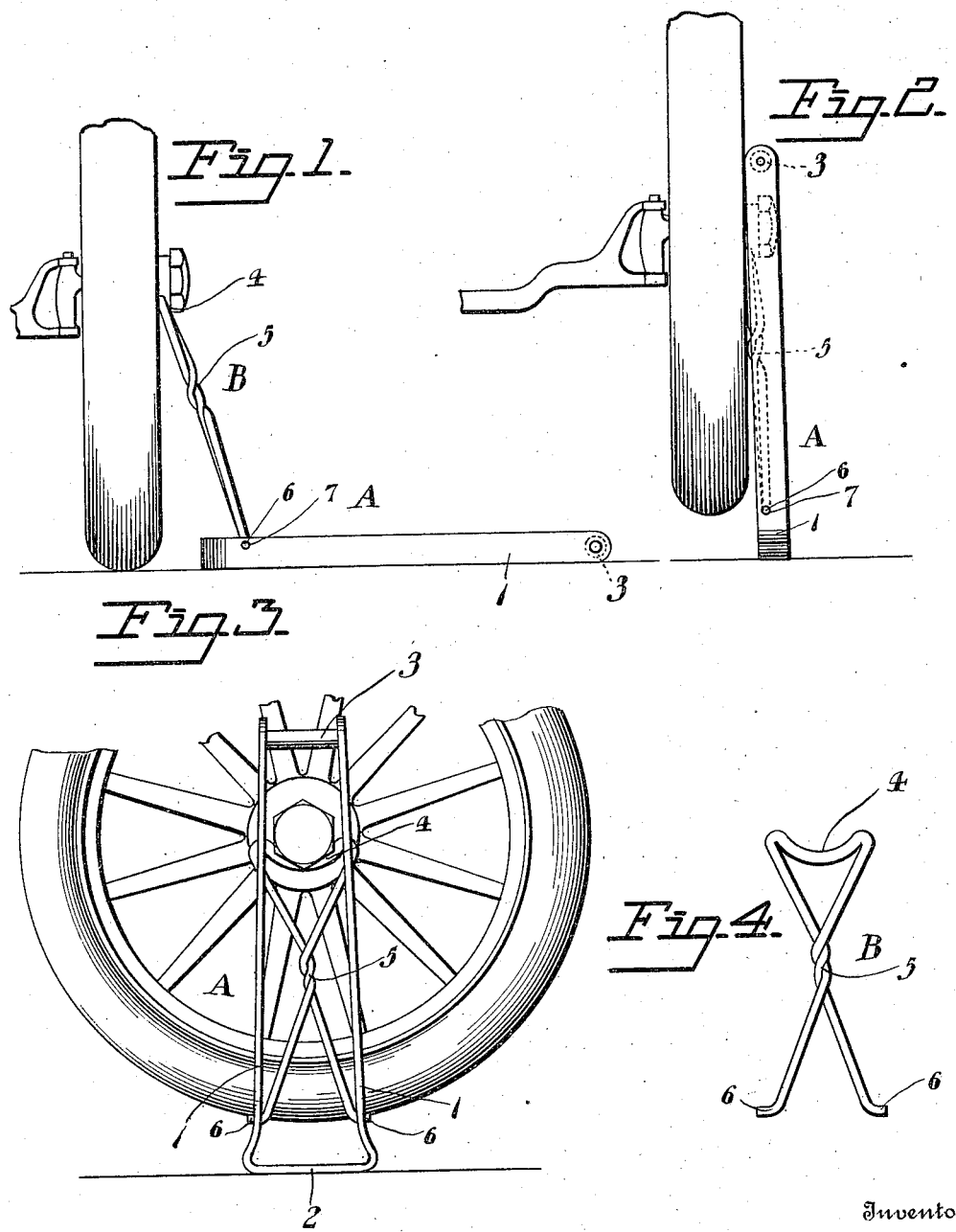
Inventor
A. A. Kellogg
Witnesses
John D. Spalding
P. M. Smith
By Victor J. Evans
Attorney

UNITED STATES PATENT OFFICE.

ALBERT A. KELLOGG, OF CLINTON, MISSOURI.

AUTOMOBILE-JACK.

1,178,855.  Specification of Letters Patent.  Patented Apr. 11, 1916.

Application filed November 6, 1915. Serial No. 60,091.

*To all whom it may concern:*

Be it known that I, ALBERT A. KELLOGG, a citizen of the United States, residing at Clinton, in the county of Henry and State of Missouri, have invented new and useful Improvements in Automobile-Jacks, of which the following is a specification.

This invention relates to automobile jacks, the object in view being to provide a small compact and reliable jack especially adapted to elevate and lower a wheel by engagement with the hub thereof, the said jack being of novel construction and embodying means whereby the thrust is directed at an angle which will prevent the collapse of the jack when in its supporting position, the jack also being of such construction that the parts thereof are automatically locked in their supporting position.

With the above and other objects in view, the invention consists in the novel construction, combination and arrangement of parts, as herein described, illustrated and claimed.

In the accompanying drawings:—Figure 1 is a side elevation of the jack showing the initial position thereof in its relation to the hub of a wheel to be raised. Fig. 2 is a similar view showing the final or supporting position of the jack. Fig. 3 is a view taken at right angles to Figs. 1 and 2 showing the relation between the lifting lever and the thrust member. Fig. 4 is a detail view of the thrust member.

Referring to the drawings A designates generally the main lifting lever which is preferably composed of a strip of metal bent to form the substantially parallel arms 1 united at their lower ends by the integral connecting portion 2 which forms the base of the lever when in its upright or supporting position as shown in Fig. 2. The extremities of the arms 1 are connected at their opposite ends by means of a hand grip 3, the lever A as a whole being thus of open center and substantially rectangular formation.

In connection with the lever A I employ a thrust member designated generally at B and made up of a suitable length of stout wire or a rod bent and twisted upon itself into a shape resembling that of an ordinary hour glass. Described more in detail, the rod of which the thrust member B is formed is bent about centrally of its length to form a depressed arcuate hub supporting rest 4 from the opposite extremities of which the terminal portions of the rod are bent to converge toward each other where at a central point they are twisted around or upon each other as shown at 5 and then extended divergently for a suitable distance where the extremities 6 are bent outwardly to form pivots or pintles, the latter being inserted in holes 7 in the arms 1 of the lever A. The device is first placed in the position shown in Fig. 1 with the lever A lying upon the ground or floor and the thrust member B inclined so that the rest 4 bears against the under side of the hub of a wheel. The hand grip 3 is then grasped by the operator and raised from the position shown in Fig. 1 to the position shown in Fig. 2 where it rests against the wheel and sustains the jack in the illustrated relation to the wheel and its hub. It will be noted that the holes 7 are arranged nearer to the inner edge of the lever A when in its supporting position so as to cause the upper extremity of the lever to move inwardly past the pivotal connection between the members A and B. This as clearly shown in Fig. 2 effects an automatic locking of the two members of the device and prevents the accidental collapse thereof.

The particular formation of the thrust member B as herein shown and described provides what may be termed diagonally crossing members each of which sustains the thrust member along an inclined line leading from one of the extremities of the rest 4 to the opposite side of the lever A. This avoids the tendency of the thrust member as well as the lever to collapse or permit the machine to move in a fore and aft direction which would result in the tipping of the jack. Furthermore, the construction is simple and economical enabling the jack to be manufactured, sold and maintained at a minimum cost.

Having thus described my invention, I claim:—

In an automobile jack, the combination of an open center substantially rectangular lifting lever having substantially parallel side arms, a thrust member consisting of a rod bent to form a hub supporting rest, and obliquely disposed portions crossing each other and twisted together intermediate their ends and having the extremities thereof bent to form pintles which are inserted through holes in the side arms of the lifting lever, forming a pivotal connection between the lever and thrust member.

In testimony whereof I affix my signature in presence of two witnesses.

ALBERT A. KELLOGG.

Witnesses:
HARRY H. ECKART,
GEORGE C. COLE.